(No Model.) 2 Sheets—Sheet 1.

F. J. RÖNITZ.
MEANS FOR MAKING ARTIFICIAL STONE.

No. 574,172. Patented Dec. 29, 1896.

Witnesses
Chas H. Smith
J. Staib

Inventor
F. J. Rönitz
L. W. Serrell & Son
Atty (No Model.) 2 Sheets—Sheet 2.
F. J. RÖNITZ.
MEANS FOR MAKING ARTIFICIAL STONE.
No. 574,172. Patented Dec. 29, 1896.
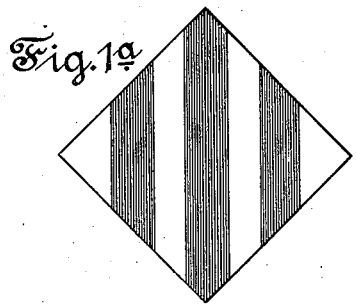
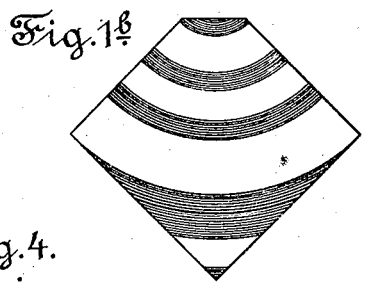
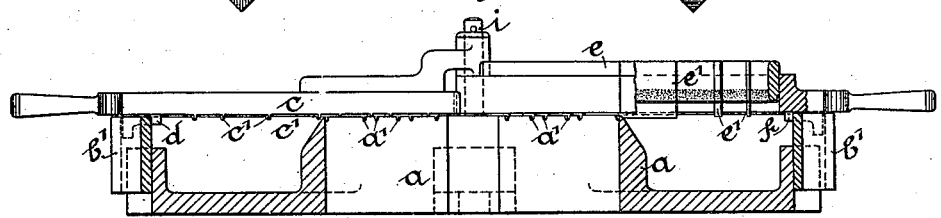
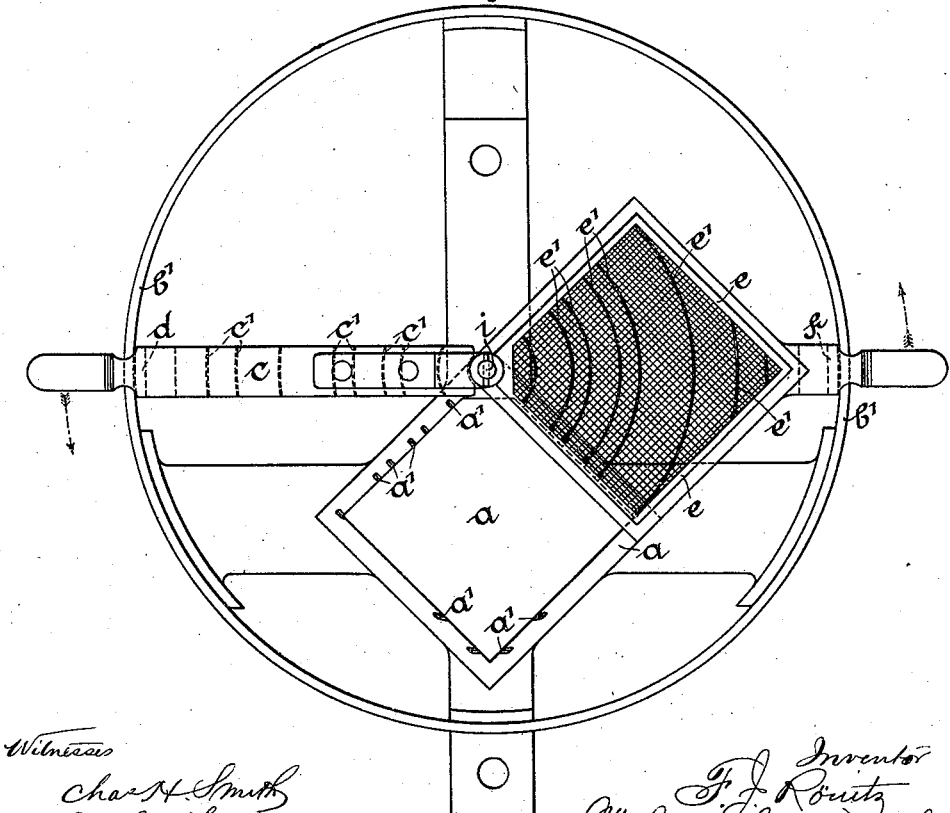

UNITED STATES PATENT OFFICE.

FERDINAND JULIUS RÖNITZ, OF MÜGELN, GERMANY.

MEANS FOR MAKING ARTIFICIAL STONE.

SPECIFICATION forming part of Letters Patent No. 574,172, dated December 29, 1896.

Application filed June 19, 1896. Serial No. 596,108. (No model.) Patented in Germany December 21, 1894, No. 83,600; in Austria May 4, 1895, No. 45/1,592, and in Belgium December 16, 1895, No. 118,879.

*To all whom it may concern:*

Be it known that I, FERDINAND JULIUS RÖNITZ, a subject of the King of Saxony, residing at Mügeln, near Dresden, Kingdom of Saxony, German Empire, have invented certain new and useful Improvements in Means for Manufacturing Artificial Stones with Colored Surfaces, of which the following is a specification.

Letters Patent for this invention have been granted to me as follows: in the German Empire, No. 83,600, dated December 21, 1894; in Austria by Privilegium, No. 45/1,592, dated May 4, 1895, and in Belgium, No. 118,879, dated December 16, 1895.

This invention refers to improvements in means for manufacturing artificial stones with colored surfaces, and has for its object the combination, with a mold into which the cement mortar is filled, of a strike-iron provided with teeth at its acting edge for dividing the surface of the mortar in the mold into divisions or fields and of a color-distributing box provided with partition-walls corresponding to the position, distance, form, and depth of the teeth of the strike-iron, said color-distributing box being furthermore provided with a sieve bottom above the lower edges of its partition-walls for distributing the powdered color substances upon the mortar surface onto the fields divided by the strike-iron.

Figure 1:
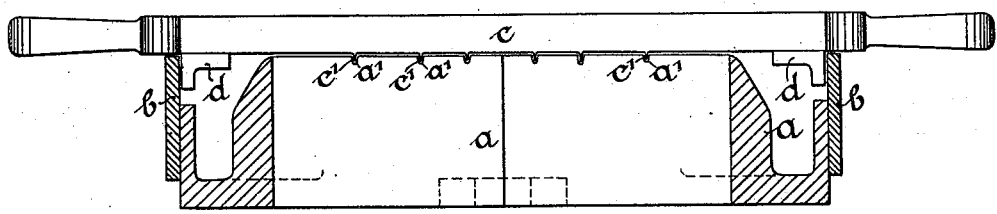
Figure 2:
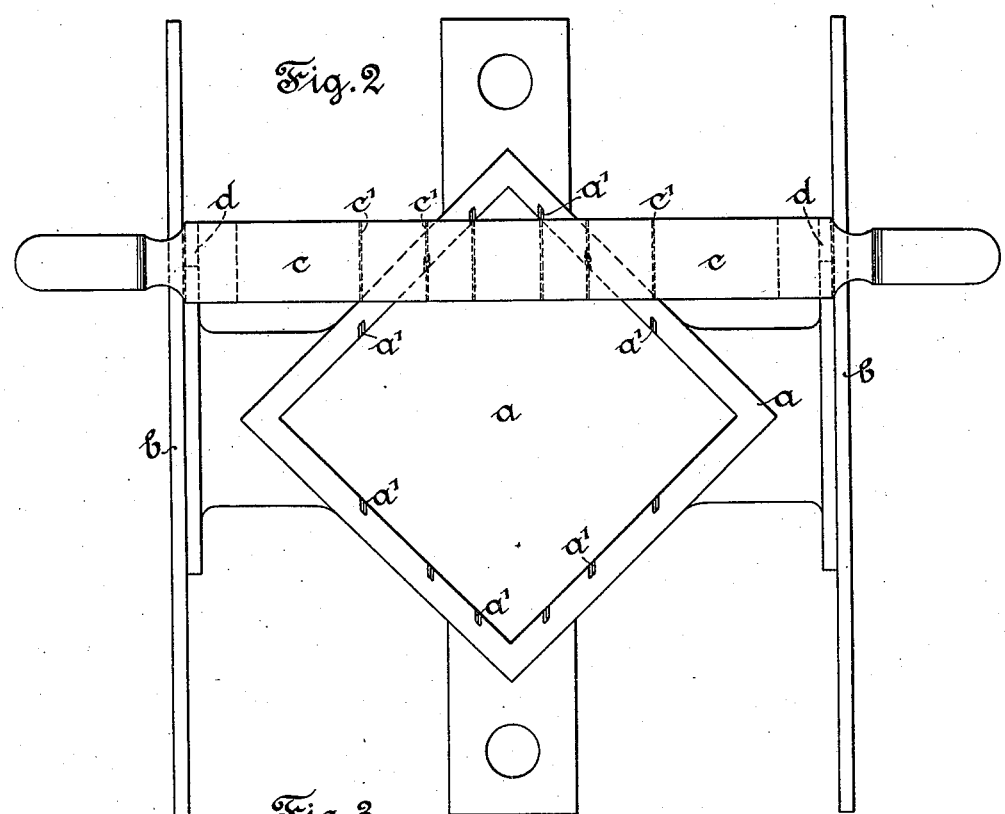
Figure 3:
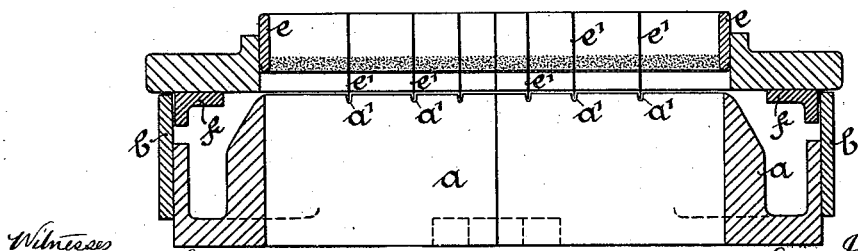

On the accompanying drawings, Figure 1 is a vertical cross-section, and Fig. 2 is a plan, of the mold for forming the stones and with the strike-iron in acting position; and Fig. 3 shows the mold and the color-distributing box in vertical cross-section. Fig. 4 is a vertical section, and Fig. 5 a plan, of the devices arranged for forming curved-line color designs. Fig. 1$^a$ is a plan of a straight-line color-design stone, and Fig. 1$^b$ is a plan of a curved-line color-design stone. These means, as shown in Figs. 1, 2, and 3, will serve for producing stones with colored design in straight lines, Fig. 1$^a$.

$a$ is the mold, into which the mortar is beaten for forming the stone, and which mold is fixed upon a suitable support. The mold may be provided with a movable bottom plate for raising the stone out of the mold. On the sides of the mold are arranged guide-fillets $b\ b$, upon which the strike-iron $c$ is placed. This strike-iron is provided with projections $d\ d$, by which the strike-iron is guided in an accurate manner while being moved to and fro over the mold on the raceway formed by the fillets $b$.

The strike-iron is provided at its lower edge with teeth $c'$, and the surface of the mold's rim is made with slots or indentations $a'$, which correspond in position, depth, form, and distance to the teeth $c'$ of the strike-iron, so that these teeth, while the strike-iron is moved over the mold filled with cement mortar, will cut lines into the surface of the mortar, so as to divide this surface into distinct and separate fields for receiving different colors.

The color-distributing box $e$ consists mainly of a frame corresponding in shape to the mold $a$. The box $e$ is provided at the bottom with a sieve for the color in its powdered state to pass through when the box is in proper position over the mold $a$. The box $e$ is divided into compartments by means of partition-walls $e'$, which, with their lower edges, project below the sieve. These partition-walls correspond in position exactly with the teeth $c'$ of the strike-iron and with the indentations $a'$ in the surface of the mold-rim. Each compartment may be filled with powder differing in color to the adjacent compartment or compartments. In order to cover these fields with the different colors, the color-distributing box is put over the mold on the raceway formed by the guiding-fillets $b$, as shown in Fig. 3, and is guided between these fillets by means of the projections $f\ f$, and so that the lower edges $e'$ of the partition-walls projecting below the color-distributing box and its sieve bottom will exactly take into the slots or indentations $a'$ of the mold $a$.

After the different colored substances have by one single action been thus distributed upon the different fields of the cement-mortar surface the color-distributing box has to be removed by being shifted on the guide-fillets $b$. The edges $e'$ of the partition-walls moving in the cement-mortar surface and sliding within the fluted lines of said surface will insure the exact separation of the different color-fields, and this separation will be completed by again moving the strike-iron over the surface.

Fig. 1ª shows a stone with different color-fields produced as aforesaid, and these fields have straight parallel borders. If these borders are curved, as indicated by Fig 1ᵇ, the above-described device must be altered, as shown in cross-section, Fig. 4, and plan, Fig. 5. In this case the mold $a$ itself for receiving the cement mortar is arranged the same way as in Fig. 2, the guide-race $b$, however, for the strike-iron $c$ and for the color-distributing box $e$ is circular, and the strike-iron and color-distributing box are made to swing around a center pivot $i$. The strike-iron $c$ is provided at its lower edge with teeth $e'$, which in this case must have a curved form, and to correspond with the form of these teeth the slots or indentations $a'$ on the upper edge of the mold must be of curved form, and also the lower projecting walls $e'$ of the color-distributing box $e$ must be formed in curved lines.

The strike-iron is provided with one handle and with a projection $d$. The color-distributing box is also provided with one handle and with a projection $f$. The strike-iron and the color-distributing box are moved and guided on the circular raceway around the center pivot.

In using the above devices, whether for the production of stones with straight-lined colored design, according to Figs. 1, 2, 3, and 1ª, or of stones with curved colored design, according to Figs. 4, 5, and 1ᵇ, I proceed as follows: I first fill the mold with the moist cement mortar or concrete and smooth down or equalize the surface of such substance by means of the strike-iron, which in being moved to and fro will divide said surface into a number of fields by slots or grooves, caused by the iron's teeth. I slide the color-distributing box over the mold, the lower projecting edges of the partition-walls of said box fitting exactly into the slots or grooves in the cement-surface made by the strike-iron. One or more little vibrations, by striking the color-distributing box with a small hammer, will cause the powdered color to drop from each compartment of the box upon its own field. I then shift the box away from the stone and I again pass the strike-iron over the cement-surface, thereby smoothing down the colored powder in the wet or moist cement. I finally remove the stone from the mold.

I claim as my invention—

1. The combination with a mold for receiving the cement, mortar or concrete, having slots in its upper edges, of a strike-iron having projecting teeth corresponding in position and depth with the slots in the upper edges of the mold and means connected with the mold for guiding the strike-iron over the mold, substantially as set forth.

2. The combination with a mold for receiving the cement, mortar or concrete, having slots in its upper edges, of a color-distributing box having partition-walls forming compartments for receiving different colors, and the lower edges of whose walls project to fit the slots in the upper edges of the mold, and means connected with the mold for guiding the color-distributing box over the mold, substantially as set forth.

In testimony that I claim the foregoing as my invention I have signed my name in presence of two subscribing witnesses.

FERDINAND JULIUS RÖNITZ.

Witnesses:
WILHELM WIESENHÜTTER,
HERNANDO DE SOTO.